US 8,275,899 B2

(12) United States Patent
Beckett, III et al.

(10) Patent No.: US 8,275,899 B2
(45) Date of Patent: Sep. 25, 2012

(54) METHODS, DEVICES AND COMPUTER PROGRAM PRODUCTS FOR REGULATING NETWORK ACTIVITY USING A SUBSCRIBER SCORING SYSTEM

(75) Inventors: William R. Beckett, III, Marlboro, NJ (US); Deepak Chawla, Ocean, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 112 days.

(21) Appl. No.: 12/344,987

(22) Filed: Dec. 29, 2008

(65) Prior Publication Data

US 2010/0169474 A1 Jul. 1, 2010

(51) Int. Cl.
*G06F 15/16* (2006.01)
(52) U.S. Cl. .......... 709/232; 709/225; 709/226; 726/22; 726/23; 726/24; 726/25
(58) Field of Classification Search .......... 709/223–225; 726/22–25
See application file for complete search history.

(56) References Cited

U.S. PATENT DOCUMENTS

| | | | | |
|---|---|---|---|---|
| 5,559,726 A * | 9/1996 | Berry | | 702/181 |
| 7,069,256 B1 * | 6/2006 | Campos | | 706/16 |
| 7,433,960 B1 * | 10/2008 | Dube et al. | | 709/229 |
| 7,490,356 B2 * | 2/2009 | Lieblich et al. | | 726/25 |
| 7,849,032 B1 * | 12/2010 | Campos et al. | | 706/25 |
| 2003/0182420 A1 * | 9/2003 | Jones et al. | | 709/224 |
| 2004/0158630 A1 * | 8/2004 | Chang et al. | | 709/224 |
| 2004/0225627 A1 * | 11/2004 | Botros et al. | | 706/16 |
| 2004/0260801 A1 * | 12/2004 | Li | | 709/223 |
| 2005/0216519 A1 * | 9/2005 | Mayo et al. | | 707/200 |
| 2007/0124246 A1 * | 5/2007 | Lawyer et al. | | 705/50 |
| 2007/0169178 A1 * | 7/2007 | Keohane et al. | | 726/4 |
| 2007/0239999 A1 * | 10/2007 | Honig et al. | | 713/194 |
| 2007/0245420 A1 * | 10/2007 | Yong et al. | | 726/23 |
| 2007/0294187 A1 * | 12/2007 | Scherrer | | 705/75 |
| 2008/0189788 A1 * | 8/2008 | Bahl | | 726/25 |
| 2008/0235771 A1 * | 9/2008 | Corley et al. | | 726/4 |
| 2008/0271143 A1 * | 10/2008 | Stephens et al. | | 726/22 |
| 2008/0312968 A1 * | 12/2008 | Hannon et al. | | 705/4 |
| 2010/0074125 A1 * | 3/2010 | Chandra et al. | | 370/252 |

* cited by examiner

*Primary Examiner* — Duyen Doan

(74) *Attorney, Agent, or Firm* — Myers Bigel Sibley & Sajovec, P.A.

(57) ABSTRACT

Network activity in a network is regulated. Network activity scores that correspond to network usage patterns for respective network users are calculated. A network user is assigned into one of multiple risk classes responsive to a respective one of the network activity scores. A subsequent action is selected responsive to which of the risk classes the network user is assigned.

15 Claims, 6 Drawing Sheets

METHODS, DEVICES AND COMPUTER PROGRAM PRODUCTS FOR REGULATING NETWORK ACTIVITY USING A SUBSCRIBER SCORING SYSTEM

BACKGROUND

The present disclosure relates to methods and computer program products related to networks and, more particularly, to regulating computer networks.

As the cost of computing devices has diminished, computers and computer networks have grown increasingly prevalent in use. One example of a network includes the Internet, which has become a common resource for many people and businesses. For example, many households now have personal computers that are connected to the Internet via a high speed service such as, for example, a broadband service.

Although the Internet may provide many useful resources for users, widespread access also provides an avenue for unscrupulous users and/or activities. In this regard, many Internet users do not possess the knowledge and/or sophistication to avoid risks associated with accessing the Internet. Accordingly, many users may fall victim to exploits and/or malicious schemes of undesirable elements on the Internet, such as, for example, hackers. In some instances, hackers may be capable of surreptitiously hijacking a user's personal computer and using it for fraudulent purposes. For example, hackers may plant spyware on users' personal computers in order to illegally obtain valuable identifying information.

Additionally, a user's personal computer may be used by a hacker to engage in Internet piracy of copyright protected materials. Internet piracy may account for significant bandwidth usage, which may be problematic for a service provider. Thus far, copyright protection measures that have been deployed by, for example, the entertainment industry, have failed to curtail increases in Internet piracy. For example, millions of downloads may result from just one file that is posted on a shared network. Thus, efforts to date have been insufficient in protecting a user and/or a service provider from the results of unwanted network activity, which may pose significant risks to the user, network and/or service provider.

SUMMARY

It should be appreciated that this summary is provided to introduce a selection of concepts in a simplified form, the concepts being further described below in the Detailed Description. This summary is not intended to identify key features or essential features of this disclosure, nor is it intended to limit the scope of the invention.

In some embodiments described herein, methods of regulating network activity in a network are provided. Some embodiments of such methods may include calculating multiple network activity scores that correspond to network usage patterns for respective ones of multiple network users. Some embodiments include assigning a network user of the network users into one of multiple risk classes responsive to a respective one of the network activity scores and selecting a subsequent action responsive to which of the risk classes the network user is assigned.

Some embodiments described herein include a computer program product that includes a computer readable storage medium having computer readable program code embodied therein, the computer readable program code that includes computer readable program code configured to generate a network activity score model that is operable to provide multiple network activity scores that correspond to network usage patterns for respective ones of multiple network users. Some embodiments may include computer readable program code configured to calculate, using the network activity score model, the network activity scores that correspond to network usage patterns for respective ones of multiple network users.

In some embodiments, computer readable program code may be provided that is configured to assign a network user of the multiple network users into one of multiple risk classes responsive to a respective one of the network activity scores. Computer readable program code configured to select a subsequent action responsive to which of the risk classes the network user is assigned may also be included.

Some embodiments described herein include a device for generating a network activity score that includes a network activity score estimating module that is operable to estimate multiple model network activity scores that correspond to each of a portion of multiple network users. A device may include a probability distribution estimating module that is operable to estimate a probability distribution corresponding to the model network activity scores and an accuracy module that is operable to determine an accuracy of the model network activity scores. In some embodiments, the device may include a modification module that is operable, if the accuracy is below a predetermined threshold, to modify operations in the network activity score estimating module to improve the accuracy of the model network activity scores.

Other methods and/or computer program products according to embodiments described herein will be or become apparent to one with skill in the art upon review of the following drawings and detailed description. It is intended that all such additional methods and/or computer program products be included within this description, be within the scope as described herein, and be protected by the accompanying claims.

DETAILED DESCRIPTION OF EXEMPLARY EMBODIMENTS

Figure 1:
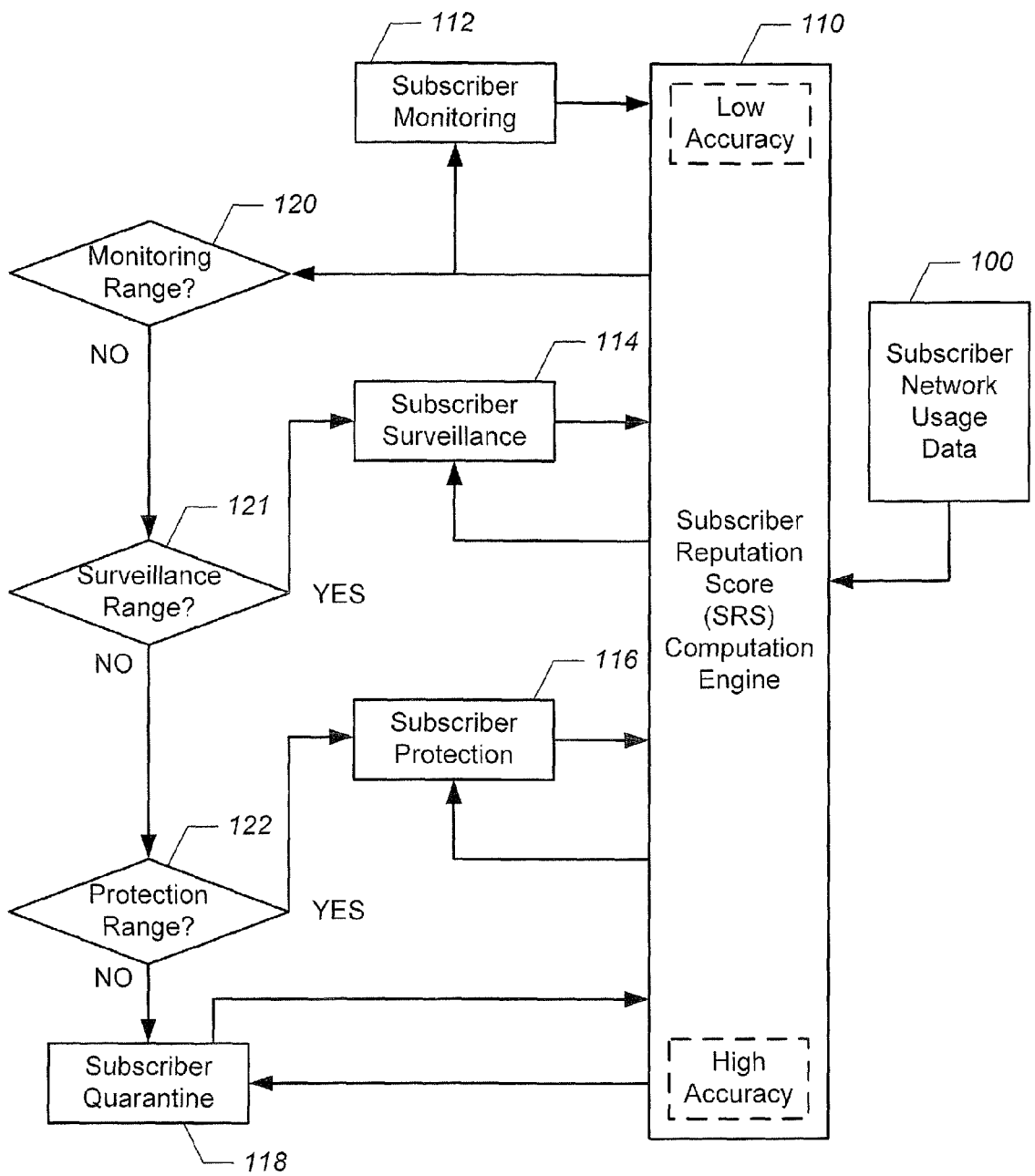
FIG. 1 is a flow diagram of operations for regulating network activity using a Subscriber Reputation Score (SRS) according to some embodiments described herein.

Specific exemplary embodiments now will be described with reference to the accompanying drawings. Embodiments may include many different forms and should not be construed as limited as set forth herein; rather, these embodiments are provided so that this disclosure will be thorough and complete, and will fully convey the scope thereof to those skilled in the art. The terminology used in the detailed description of the particular exemplary embodiments illustrated in the accompanying drawings is not intended to be limiting. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

In accordance with some embodiments herein, regulating network activity in a network, such as, for example, the Internet, may include estimating a network activity score for each user. For example, a service provider may generate a Subscriber Reputation Score (SRS) for each of its subscribers that represents the subscriber's network usage pattern.

In some embodiments, a subscriber may be associated with a subscriber device. Some embodiments provide that a subscriber includes an actual subscriber and/or other users of the subscriber device. In this regard, a network activity score may correspond to network activity of the actual subscriber and/or other users of the subscriber device.

The SRS may correlate to a security risk level of the network activity of the subscriber. Generating the SRS may include developing a model for a SRS engine. The SRS may be used to identify subscribers engaged, whether volitionally or otherwise, in high-risk network activities such as, for example, file sharing and/or Internet piracy. In this regard, mitigating services may be provided and the network and/or the subscriber may be protected from such high-risk network activity.

Reference is now made to FIG. 1, which is a flow diagram of operations for regulating network activity using a Subscriber Reputation Score (SRS) according to some embodiments described herein. A Subscriber Reputation Score (SRS) computation engine 110 is configured to receive subscriber network usage data 100 and generate a SRS for each subscriber in a network. In some embodiments, the network may include the Internet. Some embodiments provide that network usage data 100 includes network flow data such as, for example, bandwidth utilization, usage data, and/or a variety of measures of activity continuity. For example, a subscriber who is continuously logged in and/or actively transferring and/or receiving data for long periods of time may be participating in high-risk network activities, such as, for example, illegal file sharing.

In some embodiments, a subscriber may be associated with a subscriber device. Some embodiments provide that a subscriber includes an actual subscriber and/or other users of the subscriber device. In this regard, a SRS may correspond to network activity of the actual subscriber and/or other users of the subscriber device.

The SRS that is generated by the SRS computation engine 110 may be evaluated for inclusion in the monitoring range (block 120). Regardless of the SRS, the subscriber may be monitored without any additional scrutiny since the monitoring range may correspond to a low risk network activity (block 112). In some embodiments, all subscribers may be monitored at a subscriber monitoring level (block 112) even if they are also subject to higher levels of scrutiny by virtue of their SRS. By way of example, in some embodiments, the SRS may be generated as a numerical value between 0 and 100 such that 100 correlates to low risk network activity and 0 correlates to high-risk network activity. In such embodiments, the monitoring range may be from 50 to 100 such that a subscriber having a SRS between 50 and 100 is not considered to be a high risk and may be monitored for changes in SRS. Results of the subscriber monitoring 112 may be received by the SRS computation engine 110 to update and/or modify the SRS as warranted by subsequent network activity.

If the SRS is not within the monitoring range, the SRS may be evaluated for inclusion in the surveillance range (block 121). Continuing with the example discussed above regarding a SRS range from 0 to 100, an exemplary surveillance range may be from 25 to 50 such that a subscriber having a SRS in the surveillance range may be considered as having greater risk and/or vulnerability to higher risk network activity than a subscriber having a SRS in the monitoring range. A subscriber having a SRS in the surveillance range may be subject to subscriber surveillance 114. In addition to continued monitoring of the SRS for changes, subscriber surveillance 114 may include gathering additional evidence of network security violations and/or unauthorized and/or high-risk network activity. Some embodiments provide that such evidence may include data that is not itself risky, but merely may be used to identify high-risk activity. In some embodiments, network activity vulnerabilities may be discovered under subscriber surveillance 114.

In some embodiments, data gathered in subscriber surveillance 114 may be used by the SRS computation engine 110 to modify and/or update the SRS. In this manner, the SRS may be more accurate by virtue of the additional scrutiny afforded by subscriber surveillance 114. Some embodiments provide that data gathered in any capacity and/or scrutiny level may be continuously fed back to the SRS computation engine 110 to continuously improve the accuracy of the SRS.

If the SRS is not within the surveillance range, the SRS may be evaluated for inclusion in the protection range (block 122). Continuing with the example discussed above regarding a SRS range from 0 to 100, an exemplary protection range may be from 10 to 25 such that a subscriber having a SRS in the protection range may be considered as having been compromised and that the subscriber and/or the network should be protected from additional high-risk network activity via that subscriber. A subscriber having a SRS in the protection range may be subject to subscriber protection 116 actions.

In some embodiments, subscriber protection 116 may include corrective actions that may be taken to neutralize threats posed by high-risk network activity. Some embodiments provide that subscriber protection 116 may include providing a walled-off and/or secured portion in the network in which the subscriber can have limited access to the network. For example, in some embodiments, access to risky network resources, such as, for example, illegal file sharing websites, may be denied.

Some embodiments provide that subscriber protection 116 may include a security portal that may be accessed by subscribers. A security portal may include an open access from the walled-off portion to one or more utilities that may be used by subscribers to clean and/or restore their devices. In some embodiments, subscriber protection 116 may include providing technical support for subscribers via telephonic and/or email services. Some embodiments provide that subscriber protection 116 may include routing subscriber traffic through one or more security devices to identify and/or block unwanted, malicious, and/or otherwise high-risk network activity.

In some embodiments, data gathered in subscriber protection 116 may be used by the SRS computation engine 110 to modify and/or update the SRS. In this manner, the SRS may be more accurate by virtue of the additional scrutiny afforded by subscriber protection 116.

If the SRS is outside of the protection range, the SRS may be in the range from 0 to 10, which may be designated as subscriber quarantine 118. A subscriber having a SRS in the quarantine range may be considered as having been hijacked and/or infected. Subscriber quarantine 118 may result in the subscriber being completely isolated and/or network access denied. In some embodiments, denial of network access may be continued until the subscriber devices are restored and/or upgraded to prevent future high risk and/or unauthorized network activity. Some embodiments provide that violations of acceptable use policies of a service provider may be identified.

In some embodiments, data gathered in subscriber quarantine 118 may be used by the SRS computation engine 110 to modify and/or update the SRS. In this manner, the SRS may be more accurate by virtue of the additional scrutiny afforded by subscriber protection (block 116). Some embodiments provide that the SRS computation engine 110 generates a SRS with an accuracy level that increases corresponding to the level of subscriber scrutiny. For example, a SRS generated in subscriber quarantine 118 may be based on more detailed analysis and/or data than a SRS generated in subscriber monitoring 112. For example, where subscriber monitoring 112 may rely on header data gathered in network flow analysis, the increasing scrutiny associated with subscriber surveillance 114, subscriber protection 116 and/or subscriber quarantine 118 may use varying levels of deep packet inspection (DPI) analysis of the network traffic of the subscriber. Some embodiments provide that positive changes in a SRS may result in a subscriber being reclassified to a lower network activity risk level. For example, a subscriber in subscriber surveillance 114 may be reclassified to subscriber monitoring 112 if the SRS crosses the appropriate threshold.

Figure 2:
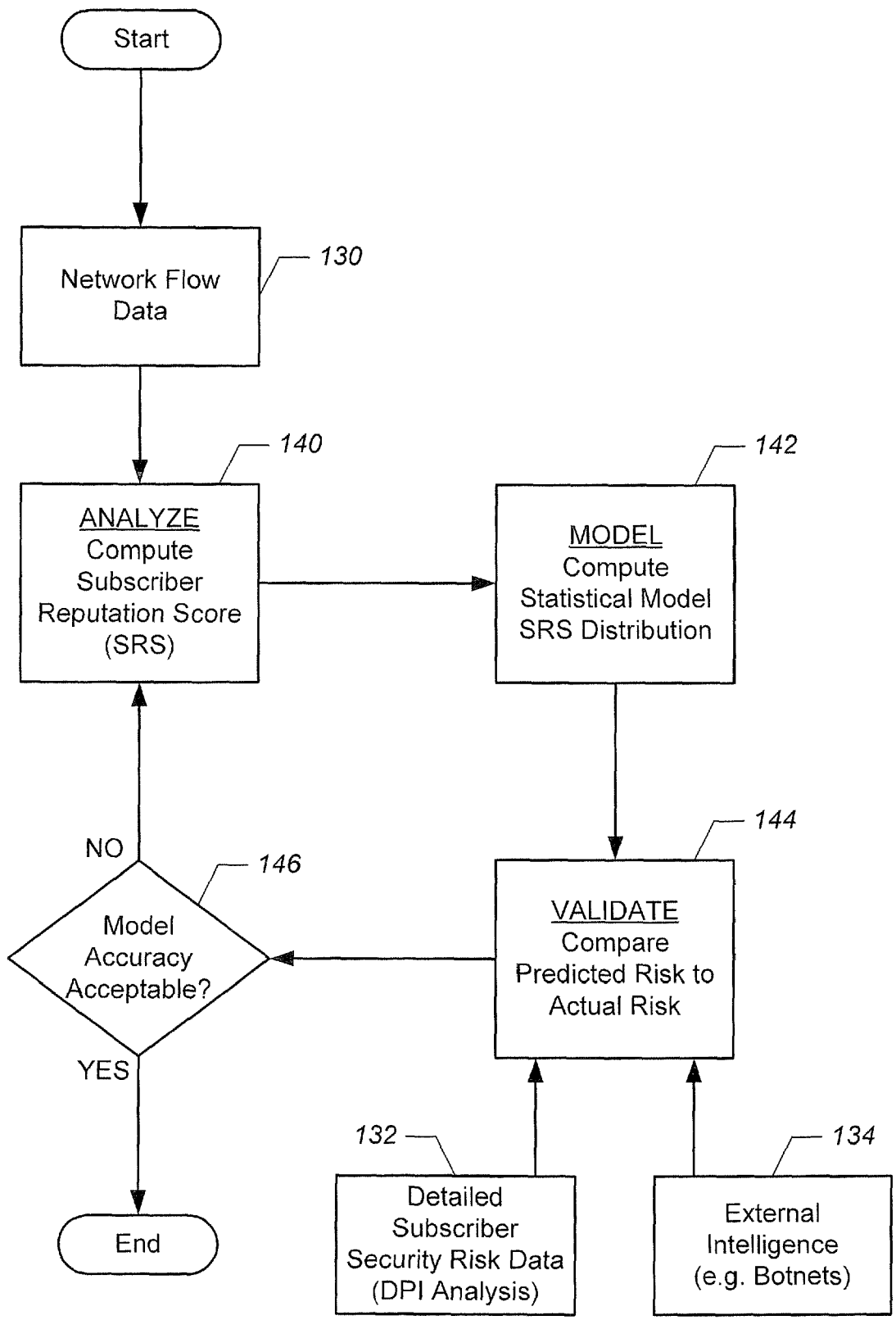
FIG. 2 is a flow diagram of operations for generating a SRS model according to some embodiments described herein.

Reference is now made to FIG. 2, which is a flow diagram of operations for generating a SRS model according to some embodiments described herein. Some embodiments provide that operations described herein may be performed in data processing, computing, network monitoring, control, communication, analysis and/or routing devices. Operations include analyzing a portion of the network subscribers to compute network activity scores for each of the portion of network subscribers (block 140) using, for example, network flow data 130. In some embodiments, the network activity scores may be expressed as Subscriber Reputation Scores (SRS). Operations may include modeling the SRS's by computing a statistical model SRS distribution (block 142). In some embodiments, a probability distribution, such as, for example, a Gaussian (normal) distribution may be used to model the SRS data.

The SRS distribution may be validated by comparing the predicted risk as represented through the probability distribution to actual risk corresponding to the portion of network subscribers (block 144). Some embodiments provide that validating the SRS distribution may use detailed subscriber security risk data that may be determined using, for example, deep packet inspection (DPI) analysis (block 132). In some embodiments, external intelligence from sources such as, for example, Botnets, automated and/or distributed computing resources, may also be used in the validating operation (block 134). By using detailed subscriber security risk data 132 and/or external intelligence 134, actual risk may be determined for each of the portion of network subscribers. The actual risk may then be compared to the predicted risk.

If, based on the comparison, the model accuracy is acceptable (block 146), then the SRS model generation is complete. In some embodiments, the model accuracy may be determined as an acceptable level based on an initial model requirement. Otherwise, if the model accuracy is not acceptable, operations may continue by analyzing the portion of the network subscribers and revising the computation of the network activity scores to improve the accuracy of the model. Subsequently generated SRS data may be evaluated and the operations may continue iteratively until an acceptable level of model accuracy is achieved. Some embodiments provide that the SRS model may continuously and/or periodically analyze and revise the computation of network activity scores responsive to feedback information that may be continuously and/or periodically received during actual use. In some embodiments, a model adjustment may be made on a fixed schedule, such as, for example, a daily, weekly, and/or monthly interval, among others.

Figure 3:
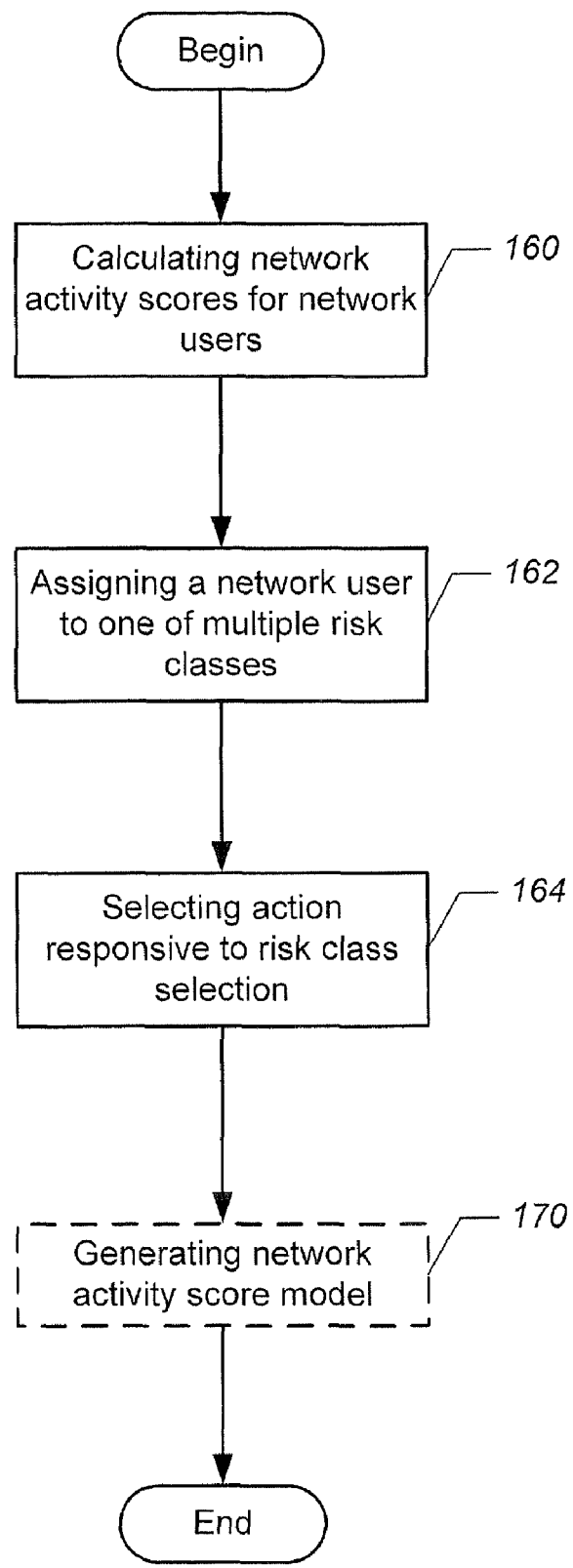
FIG. 3 is a block diagram illustrating operations for regulating network activity in a network according to some embodiments described herein.

Reference is now made to FIG. 3, which is a block diagram illustrating operations for regulating network activity in a network according to some embodiments described herein. Some embodiments provide that operations described herein may be performed in data processing, computing, network monitoring, control, communication, analysis and/or routing devices. Operations include calculating network activity scores for network users (block 160). Some embodiments provide that calculating network activity scores includes estimating network flow data corresponding to ones of the network users. For example, in an initial network activity score calculation packet header data may be used to calculate the network activity scores. In some embodiments, data including bandwidth utilization including ingress and egress ratios, rates of outbound spamming activity, level of participation in botnet activity, level of participation over Internet relay chat (IRC) channels, percent of bandwidth used in file sharing networks, and/or frequency of connection with known malicious websites and/or other network resources. In some embodiments, the network may include the Internet and estimating network flow data includes estimating bandwidth utilization of ones of the network users and estimating high risk access data corresponding to communications between ones of the users and high-risk network sources. For example, some embodiments provide that high risk access data includes percent bandwidth associated with file sharing networks, frequency of communication with known malicious sources, bandwidth ingress-egress ratios and/or rate of spamming activity.

In some embodiments, independent variables for calculating network activity scores may be acquired from internal and/or external sources, such as, for example, network flows, Internet service performance logs, security event logs, published block lists, botnet databases and/or e-mail security reports, among others.

Operations may further include assigning a network user to one of multiple risk classes based on the network activity scores (block 162). Some embodiments provide that assigning a network user to a risk class includes comparing the respective network activity score to multiple score ranges to correspond to multiple risk classes. For example, in some embodiments, risk classes, ordered from low-risk network activity to high-risk network activity, may include subscriber monitoring, subscriber surveillance, subscriber protection, and subscriber quarantine.

Some embodiments provide that an exemplary network activity score may be a numerical value that ranges from a maximum and/or perfect score that corresponds to low-risk network activity down to a minimum score that corresponds to very high-risk network activity. In some embodiments, statistical analysis may be used to determine the appropriate ranges corresponding to the risk classes. For example, a probability distribution, such as a Gaussian distribution, may be used to separate network users according to varying levels of network activity risk. In some embodiments, assigning a network user into a risk class includes identifying the risk class corresponding to the network activity score within the score range of that risk class.

Some embodiments provide operations that include selecting a subsequent action responsive to which of the risk classes the network user is assigned (block 164). Some embodiments provide that a network user is assigned to a subscriber monitoring class and the subsequent action includes monitoring the network activity score of the network user. In some embodiments, the network user is assigned to a subscriber surveillance class and subsequent actions may include gathering evidence of high-risk network activity and adjusting the network activity score responsive to the gathered evidence. Some embodiments provide that gathering evidence of high-risk network activity may include redirecting network traffic of the network user to security node that is operable to analyze the network activity of the network user via, for example, deep packet inspection (DPI) analysis, among others.

In some embodiments, a network user is assigned to a subscriber protection class and subsequent actions may include monitoring the network activity score of the network user, denying network access to known high-risk network sources, and/or providing risk mitigation services to the network user. Some embodiments provide that risk mitigation services may include notifying the network user regarding high-risk network activity and providing network services that are operable to remove sources of high-risk network activity from a network device used by the network user. In this manner, the network user and/or the network may be protected from subsequent high-risk activity.

In some embodiments, the network user is assigned to a subscriber quarantine class and subsequent actions may include isolating the network user from the network and/or providing network device restoration and/or update services to the network user. For example, some embodiments provide that updated firmware and/or software may be provided to protect against subsequent high-risk activity. Network isolation associated with subscriber quarantine may continue until the condition(s) that facilitates the high-risk network activity is removed, updated, and/or corrected.

Figure 4:
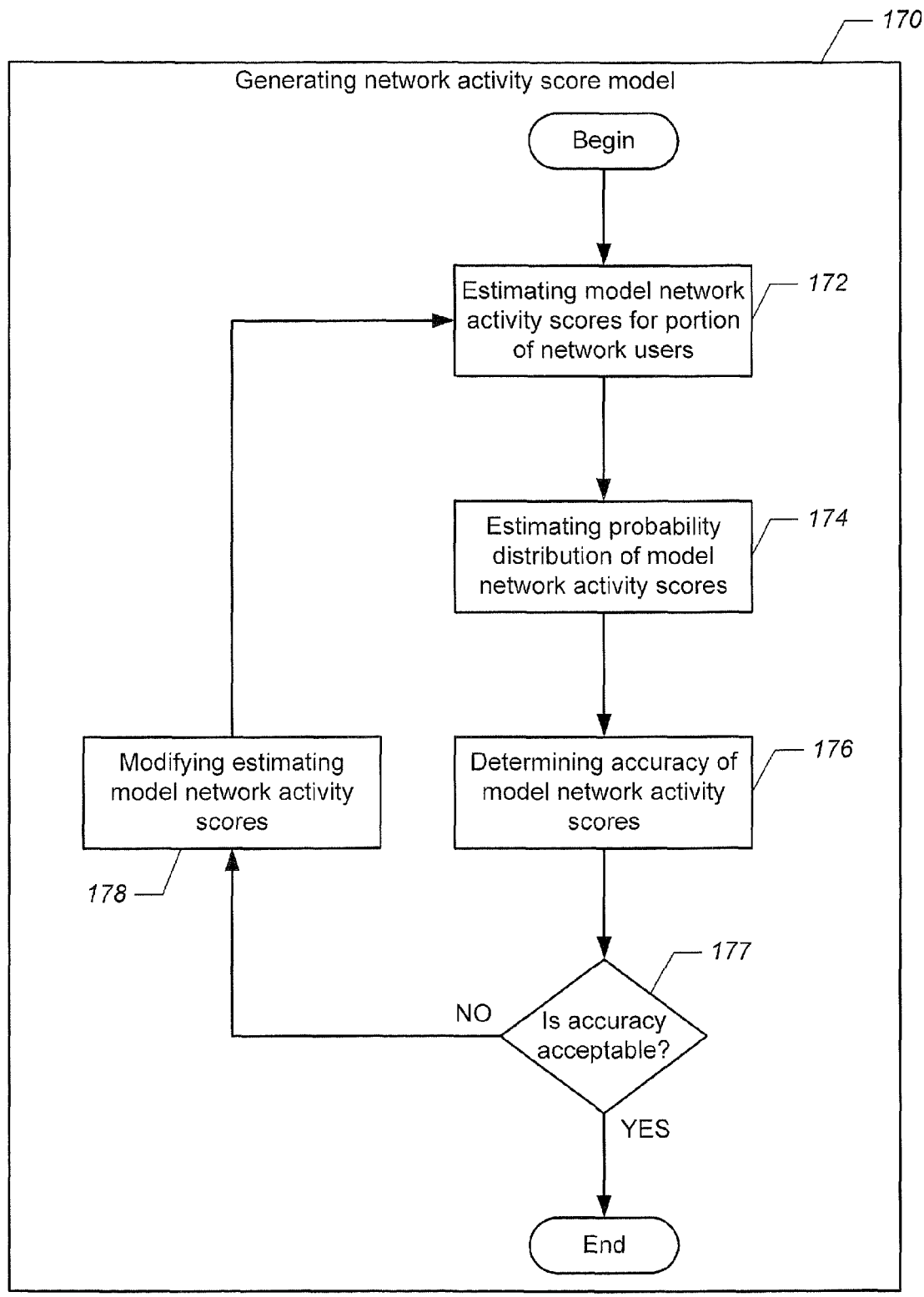
FIG. 4 is a block diagram illustrating operations for generating a network activity score model according to some embodiments described herein.

Operations according to some embodiments may include generating a network activity score model that is operable to provide network activity scores corresponding to network usage patterns for the network users (block 170). Referring to FIG. 4, which is a block diagram illustrating operations for generating a network activity score model according to some embodiments described herein, generating a network activity score model may include estimating multiple model network activity scores that correspond to a portion of the network users (block 172). In this manner, a sample of the network users may be analyzed to generate a model that may be applied to all network users. Some embodiments provide that a probability distribution corresponding to the model network activity scores may be estimated (block 174). In some embodiments, the network activity probability distribution may be used to classify the portion of network users into multiple risk classes.

Some embodiments provide that the accuracy of the model network activity scores may be determined (block 176). If the determined accuracy is below a predetermined threshold (block 177), estimating the model network activity scores may be modified and the accuracy thereof be improved (block 178). In some embodiments, determining the accuracy of the model network activity scores includes estimating an actual risk corresponding to each of the portion of network users via detailed user network activity data. Some embodiments may include comparing the actual risk to a predicted risk that corresponds to each of the model network activity scores. In some embodiments, estimating the actual risk may include receiving externally generated network activity data corresponding to the portion of network users. If the determined accuracy of the model activity scores meets the predetermined threshold, then the network activity score model generation operations may end. Some embodiments provide that the operations for generating the network activity score model may be used iteratively to improve and/or update the performance of the model. In some embodiments, the network activity score model may be used continuously and/or periodically to adjust the performance of the model responsive to continuously and/or periodically available additional data. In this manner, performance of the model may continuously and/or periodically improve, update and/or adapt to subsequently available data.

Although not limited thereto, some embodiments provide that the network includes the Internet, network users include subscribers to an Internet service, network activity is regulated by an Internet service provider (ISP) and/or the network activity scores include Subscriber Reputation Scores (SRS) that may correlate to security risks of respective subscribers.

Figure 5:
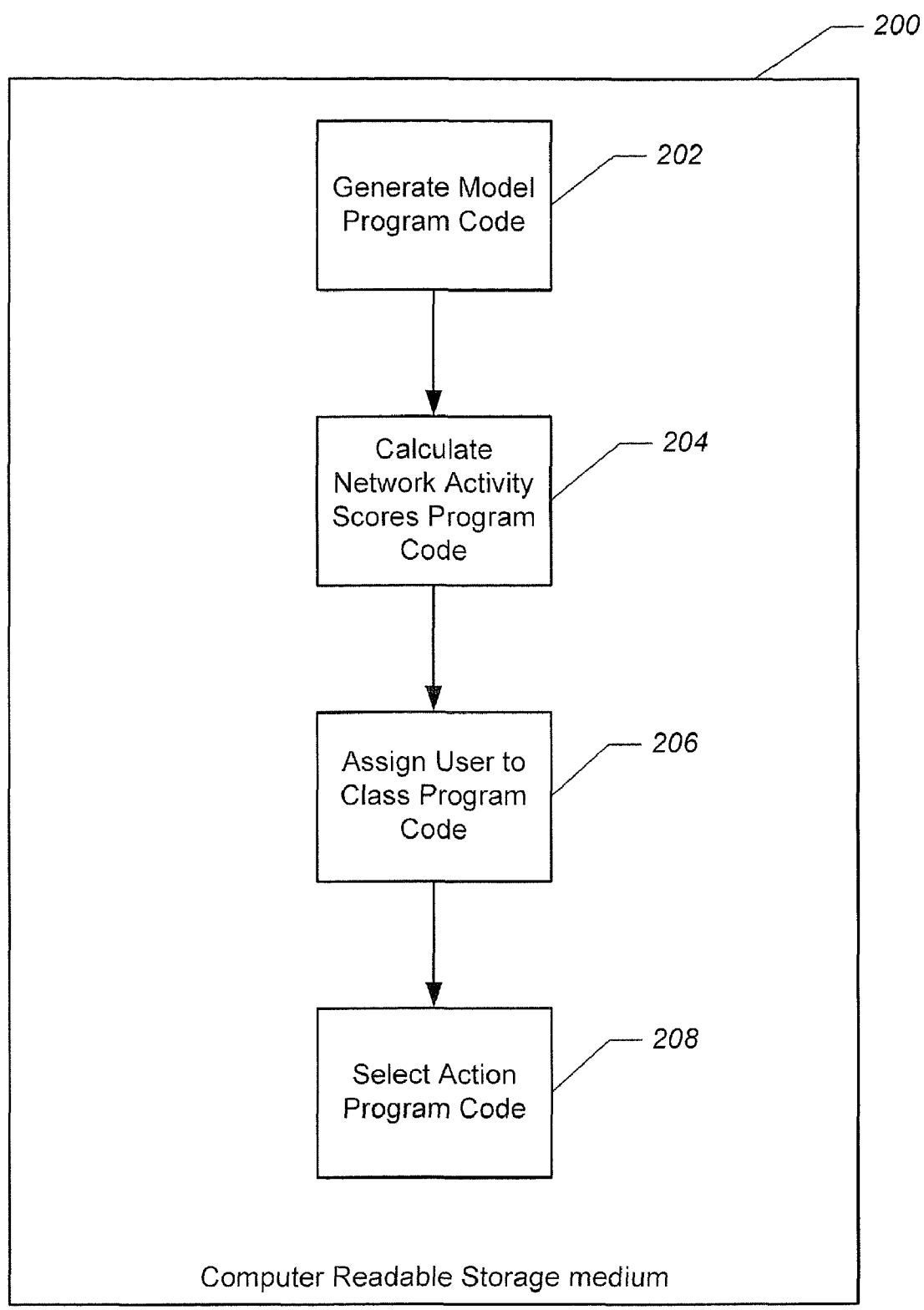
FIG. 5 is a block diagram illustrating computer readable storage medium according to some embodiments described herein.

Reference is now made to FIG. 5, which is a block diagram illustrating a computer readable storage medium according to some embodiments described herein. Some embodiments include computer readable program code that is configured to generate a network activity score model (block 202). The network activity score model may be operable to provide network activity scores that correspond to network usage patterns for respective ones of multiple network users. In some embodiments, the computer readable program code configured to generate a network activity score model may be configured to estimate model network activity scores that correspond to a portion of the network users. Some embodiments provide that generating a network activity score model may include computer readable program code configured to estimate a probability distribution corresponding to the model network activity scores.

In some embodiments, an accuracy of the model network activity scores may be determined by computer readable program code. Some embodiments provide that if the accuracy is below a predetermined threshold the computer readable program code is configured to modify the estimating operations to improve the accuracy of the model network activity scores. In this manner program code configured to generate a network activity score model may be iteratively applied until sufficient accuracy in the model network activity scores results.

Some embodiments include computer readable program code configured to calculate, using the network activity score model, network activity scores corresponding to network usage patterns for respective ones of the network users (block 204). Some embodiments of the computer readable program code may provide that each of the network users may be assigned into one of multiple risk classes based on the respective network activity scores (block 206). In some embodiments, the respective network activity scores are compared to score ranges corresponding to the risk classes and a corresponding one of the risk classes is identified based on the respective network activity score being within the respective score range.

Some embodiments may include computer readable program code configured to select a subsequent action responsive to which of the risk classes a respective network user is assigned (block 208). In some embodiments, the computer readable storage medium 200 includes computer readable program code that is configured to be executed by at least one of multiple computer network devices.

Figure 6:
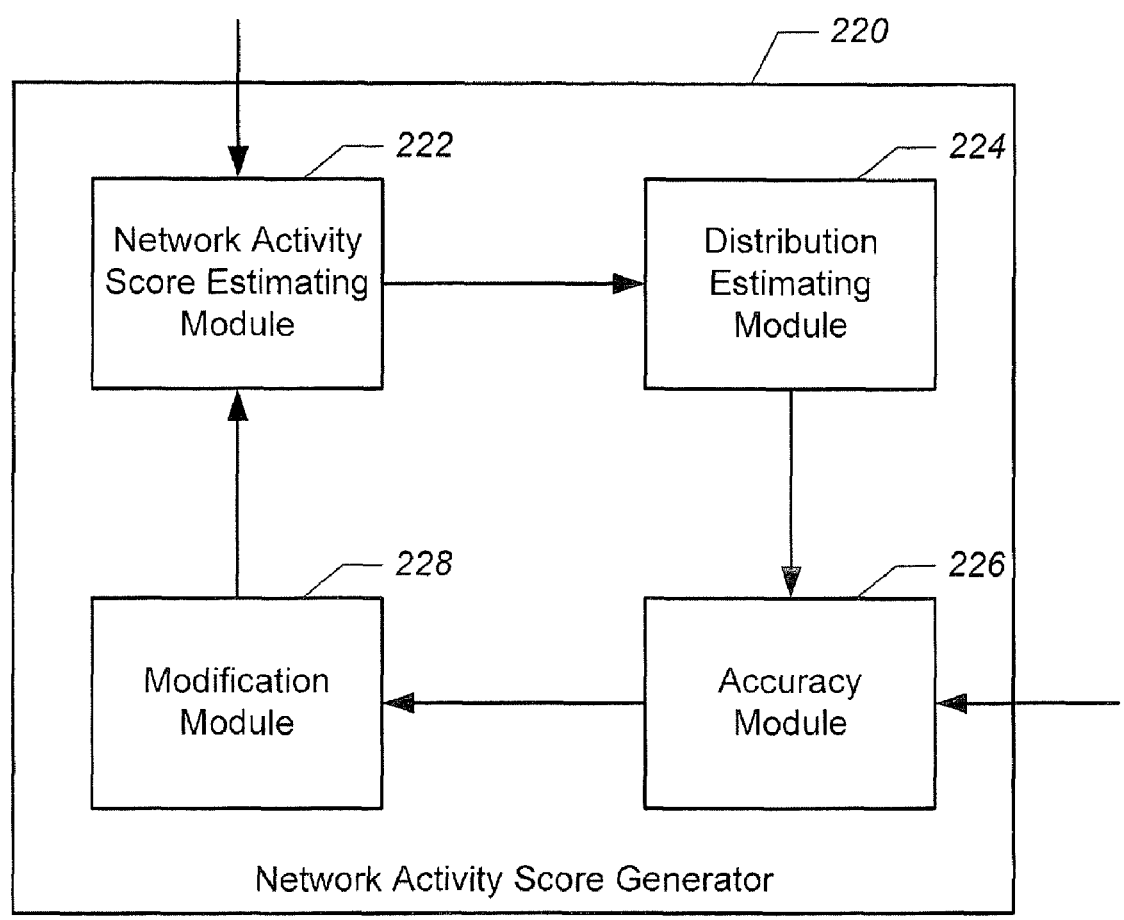
FIG. 6 is a block diagram illustrating a device for generating a network activity score in accordance with some embodiments described herein.

Reference is now made to FIG. 6, which is a block diagram illustrating a device 220 for generating a network activity score in accordance with some embodiments described herein. The device 220 includes a network activity score estimating module 222 that is operable to estimate multiple model network activity scores that correspond to a portion of the network users. In this manner, a sample of the network users may be analyzed to generate a model that may be applied to all network users. The network activity score module 222 may receive network usage data to estimate the model network activity scores. Some embodiments provide that a probability distribution estimating module 224 is operable to estimate a probability distribution corresponding to the model network activity scores. In some embodiments, the network activity probability distribution may be used to classify the portion of network users into multiple risk classes.

Some embodiments include an accuracy module 226 that is operable to determine an accuracy of the model network activity scores. In some embodiments, the accuracy module 226 may be operable to receive actual network activity risk data that may be used to compare the estimated risk as determined in the probability distribution with actual risk. If the determined accuracy is below a predetermined threshold, a modification module 228 may be operable to modify the operations in the network activity score estimating module 222 to improve the accuracy of the model network activity scores. In some embodiments, determining the accuracy of the model network activity scores includes estimating an actual risk corresponding to each of the portion of network users via detailed user network activity data. Some embodiments may include comparing the actual risk to a predicted risk that corresponds to each of the model network activity scores. In some embodiments, estimating the actual risk may include receiving externally generated network activity data corresponding to the portion of network users.

After achieving an initial accuracy of the model network activity scores is accomplished, the network activity score generator 220 may be used to generate network activity scores for all of the multiple users.

Some embodiments provide that the network activity score generator 220 may be used iteratively to improve and/or update the performance of the model. In some embodiments, the network activity score generator 220 may be used continuously and/or periodically to adjust the performance responsive to continuously and/or periodically available additional data. In this manner, performance may continuously and/or periodically improve, update and/or adapt to subsequently available data.

Although not limited thereto, some embodiments provide that the network includes the Internet, network users include subscribers to an Internet service, network activity is regulated by an Internet service provider (ISP) and/or the network activity scores include Subscriber Reputation Scores (SRS) that may correlate to security risks of respective subscribers.

As will be appreciated by one of skill in the art, the present disclosure may be embodied as a method, system, or computer program product. Accordingly, the present disclosure may take the form of an entirely hardware embodiment, a software embodiment or an embodiment combining software and hardware aspects all generally referred to herein as a "circuit" or "module." Furthermore, the present disclosure may take the form of a computer program product comprising a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present disclosure may be written in an object oriented programming language such as Javat, Smalltalk, PERL or C++. However, the computer program code for carrying out operations of the present disclosure may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present disclosure is described in part above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of FIGS. 1 through 5 illustrate the architecture, functionality, and/or operations of some embodiments of methods, systems, devices and computer program products for protecting a computer network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments. Although specific terms are employed, they are used in a generic and descriptive sense only and not for purposes of limitation, the scope of the disclosure being defined by the following claims.

That which is claimed is:

1. A computer implemented method, comprising:
performing operations as follows on at least one processor:
calculating a network activity score that corresponds to a network usage pattern for each network user of a plurality of network users;
assigning one network user of the plurality of network users into a first risk class of a plurality of risk classes responsive to the network activity score of the one network user; and
selecting a first subsequent action based on the first risk class to which the one network user is assigned,
wherein the plurality of risk classes include at least the first risk class, a second risk class and a third risk class,
wherein the plurality of network users include a first network user, a second network user and a third network user, and
wherein the second risk class is associated with a second subsequent action and the third risk class is associated with a third subsequent action,
the method further comprising assigning the second network user to the second risk class responsive to the network activity score of the second network user, selecting the second subsequent action based on the second risk class to which the second network user is assigned, assigning the third network user to the third risk class responsive to the network activity score of the third network user, and selecting the third subsequent action based on the third risk class to which the third network user is assigned;
wherein calculating the network activity score comprises estimating network flow data corresponding to each one of the plurality of network users;
wherein estimating the network flow data comprises:
estimating bandwidth utilization of each one of the plurality of network users; and
estimating high-risk-access data corresponding to communications between each one of the plurality of network users and high-risk network sources;
wherein assigning the second network user to the second risk class responsive to the network activity score of the second network user comprises assigning the second network user to a subscriber surveillance class, and
wherein selecting the second subsequent action based on the second risk class to which the second network user is assigned comprises:
gathering evidence of high-risk network activity; and
adjusting the network activity score of the second network user responsive to gathering evidence of high-risk network activity;
wherein gathering the evidence of high-risk network activity comprises:
redirecting network traffic of the network user to a security node that is operable to analyze network activity of the network user via deep packet inspection.

2. The computer implemented method according to claim 1, wherein the high-risk-access data comprises percent bandwidth in file sharing networks.

3. The computer implemented method according to claim 1, wherein assigning the one network user of the plurality of network users into one of the plurality of risk classes comprises:
comparing the network activity score of the one network user to a plurality of score ranges corresponding to the plurality of risk classes; and
identifying one of the plurality of risk classes based on the network activity score of the one network user being within a corresponding one of the plurality of score ranges.

4. The computer implemented method of claim 1, wherein assigning the one network user of the plurality of network users into the first risk class of the plurality of risk classes comprises assigning the one network user to a subscriber monitoring class, and
wherein selecting the first subsequent action based on the first risk class to which the one network user is assigned comprises monitoring the respective network activity score of the one network user and, if the network activity score of the one network user indicates an increase in network activity risk, flagging the one network user.

5. The computer implemented method according to claim 1, wherein assigning the third network user to the third risk class responsive to the network activity score of the third network user comprises assigning the third network user to a subscriber protection class, and
wherein selecting the third subsequent action based on the third risk class to which the third network user is assigned comprises:
monitoring the network activity score of the third network user;
denying network access by the third network user to known high-risk network sources; and
providing risk mitigation services to the third network user.

6. The computer implemented method according to claim 5, wherein providing risk mitigation services to the third network user comprises:
notifying the third network user regarding high-risk network activity; and
providing network services to the third network user that are operable to remove sources of the high-risk network activity from a network device used by the third network user.

7. The computer implemented method according to claim 1, wherein the plurality of risk classes includes a fourth risk class, wherein the fourth risk class comprises a subscriber quarantine class and is associated with a fourth subsequent action, and wherein the plurality of network users includes a fourth network user, further comprising assigning the fourth network user of the plurality of network users into the fourth risk class, and selecting the fourth subsequent action based on the fourth risk class to which the fourth network user is assigned, wherein selecting the fourth subsequent action based on the fourth risk class to which the fourth network user is assigned comprises:

isolating the fourth network user from the network; and providing network device restoration services to the fourth network user.

8. The computer implemented method according to claim 1, further comprising generating a network activity score model that is operable to provide the plurality of network activity scores that correspond to the network usage patterns for respective ones of the plurality of network users.

9. The computer implemented method according to claim 8, wherein generating the network activity score model comprises:

estimating a plurality of model network activity scores that correspond to each of a portion of the plurality of network users;

estimating a probability distribution corresponding to the plurality of model network activity scores;

determining an accuracy of the plurality of model network activity scores; and if the accuracy is below a predetermined threshold, modifying estimating the plurality of model network activity scores to improve the accuracy of the plurality of model network activity scores.

10. The computer implemented method according to claim 9, wherein determining the accuracy of the plurality of model network activity scores comprises:

estimating an actual risk corresponding to each of the portion of the plurality of network users via detailed user network activity data; and comparing the actual risk to a predicted risk that corresponds to each one of the plurality of model network activity scores.

11. The computer implemented method according to claim 10, wherein estimating the actual risk corresponding to each of the portion of the plurality of network users further comprises receiving externally generated network activity data corresponding to the portion of the plurality of network users.

12. The computer implemented method according to claim 1, wherein the network includes the Internet, wherein the plurality of network users include subscribers to an internet service, wherein the network activity is regulated by an internet service provider, and wherein each of the plurality of network activity scores includes a subscriber reputation score that correlates to a security risk for the respective one of the plurality of network users.

13. A computer program product, comprising:

a non-transitory computer readable medium comprising computer readable program code stored on the computer readable medium, the computer readable program code comprising:

computer readable program code configured to calculate a network activity score that corresponds to a network usage pattern for each network user of a plurality of network users;

computer readable program code configured to assign one network user of the plurality of network users into a first risk class of a plurality of risk classes responsive to the network activity score of the one network user; and computer readable program code configured to select a first subsequent action based on the first risk class to which the one network user is assigned, wherein the plurality of risk classes include at least the first risk class, a second risk class and a third risk class, wherein the plurality of network users include a first network user, a second network user and a third network user, and wherein the second risk class is associated with a second subsequent action and the third risk class is associated with a third subsequent action, the computer readable program code further comprising computer readable program code configured to assign the second network user to the second risk class responsive to the network activity score of the second network user, computer readable program code configured to select the second subsequent action based on the second risk class to which the second network user is assigned, computer readable program code configured to assign the third network user to the third risk class responsive to the network activity score of the third network user, and computer readable program code configured to select the third subsequent action based on the third risk class to which the third network user is assigned;

wherein the computer readable program code configured to calculate the network activity score comprises computer readable program code configured to estimate network flow data corresponding to each one of the plurality of network users;

wherein the computer readable program code configured to estimate the network flow data comprises:

computer readable program code configured to estimate bandwidth utilization of each one of the plurality of network users; and computer readable program code configured to estimate high-risk-access data corresponding to communications between each one of the plurality of network users and high-risk network sources;

wherein the computer readable program code configured to assign the second network user to the second risk class responsive to the network activity score of the second network user comprises computer readable program code configured to assign the second network user to a subscriber surveillance class, and wherein the computer readable program code configured to select the second subsequent action based on the second risk class to which the second network user is assigned comprises:

computer readable program code configured to gather evidence of high-risk network activity; and computer readable program code configured to adjust the network activity score of the second network user responsive to gathering evidence of high-risk network activity;

wherein the computer readable program code configured to gather the evidence of high-risk network activity comprises:

computer readable program code configured to redirect network traffic of the network user to a security node that is operable to analyze network activity of the network user via deep packet inspection.

14. The computer program product according to claim 13, wherein the computer readable program code further comprises computer readable program code configured to generate a network activity score model that is operable to provide the plurality of network activity scores that correspond to the network usage patterns for respective ones of the plurality of network users; and wherein the computer readable program code configured to generate the network activity score model comprises:

computer readable program code configured to estimate a plurality of model network activity scores that correspond to each of a portion of the plurality of network users;

computer readable program code configured to estimate a probability distribution corresponding to the plurality of model network activity scores;

computer readable program code configured to determine an accuracy of the plurality of model network activity scores; and if the accuracy is below a predetermined threshold, computer readable program code configured to modify estimating the plurality of model network activity scores to improve the accuracy of the plurality of model network activity scores.

15. The computer program product according to claim 13, wherein the computer readable program code configured to assign the one network user of the plurality of network users into the first risk class of the at least three different risk classes comprises:

computer readable program code configured to compare the respective network activity score of the one network user to a score ranges corresponding to the first risk class of the at least three different risk classes; and computer readable program code configured to identify the first risk class of the at least three different risk classes based on the network activity score of the one network user being within a score range of the first risk class, and wherein the network includes the Internet, wherein the plurality of network users include subscribers to an internet service, and wherein each of the plurality of network activity scores includes a subscriber reputation score that correlates to a security risk for each one of the plurality network users.

* * * * *

UNITED STATES PATENT AND TRADEMARK OFFICE
CERTIFICATE OF CORRECTION

| | | Page 1 of 1 |
|---|---|---|
| PATENT NO. | : 8,275,899 B2 | |
| APPLICATION NO. | : 12/344987 | |
| DATED | : September 25, 2012 | |
| INVENTOR(S) | : Beckett, III et al. | |

It is certified that error appears in the above-identified patent and that said Letters Patent is hereby corrected as shown below:

In the Claims:
Column 16, Claim 15, Line 8: Please correct "a score ranges corresponding"
                         to read -- a score range corresponding --

Signed and Sealed this
First Day of January, 2013

David J. Kappos
*Director of the United States Patent and Trademark Office*